(12) United States Patent
Dundas

(10) Patent No.: US 7,062,617 B2
(45) Date of Patent: Jun. 13, 2006

(54) METHOD AND APPARATUS FOR SATISFYING LOAD OPERATIONS

(75) Inventor: James David Dundas, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 10/108,061

(22) Filed: Mar. 26, 2002

(65) Prior Publication Data

US 2003/0188111 A1 Oct. 2, 2003

(51) Int. Cl.
*G06F 12/00* (2006.01)
(52) U.S. Cl. .................................... 711/154; 711/169
(58) Field of Classification Search ................. 711/154, 711/118, 123, 158

See application file for complete search history.

(56) References Cited

U.S. PATENT DOCUMENTS

| | | | |
|---|---|---|---|
| 5,881,262 A * | 3/1999 | Abramson et al. | 712/216 |
| 6,393,536 B1 * | 5/2002 | Hughes et al. | 711/159 |
| 6,684,301 B1 * | 1/2004 | Martin | 711/151 |
| 2003/0051099 A1 * | 3/2003 | Yoaz et al. | 711/118 |

* cited by examiner

*Primary Examiner*—Hong Chong Kim
*Assistant Examiner*—Shane M. Thomas
(74) *Attorney, Agent, or Firm*—Erik M. Metzger

(57) ABSTRACT

A method and apparatus for satisfying load operations by accessing data from a store buffer is described herein. It is a further goal of the present invention to satisfy load operations faster than prior art techniques in most cases. Finally, it is a goal of the present invention to provide an improved technique for satisfying load operations that does not significantly impact processor performance in the event that a present load is not satisfied within a predetermined amount of time.

32 Claims, 9 Drawing Sheets

$C_i = G_i + P_iC_{i+1}$   $P_i = !T_{i+1} !M_{i+1}$   $Hit_j = C_jM_j$

Load LA [15:0] = A

| FSFB ADDRESSES | $G_j$ | $T_i$ | $M_i$ | $!T_{i+1}$ | $!M_{i+1}$ | $P_i$ | $C_j$ | $Hit_j$ |
|---|---|---|---|---|---|---|---|---|
| 15 B | 0 | 0 | 0 | 1 | 1 | 1 | 0 | 0 |
| 14 D | 0 | 0 | 0 | 1 | 1 | 1 | 0 | 0 |
| 13 A | 1 | 0 | 1 | 1 | 1 | 1 | 1 | 0 |
| 12 E | 0 | 0 | 0 | 1 | 0 | 0 | 1 | 0 |
| 11 C | 0 | 0 | 0 | 1 | 1 | 1 | 1 | 0 |
| 10 A | 0 | 0 | 1 | 1 | 1 | 1 | 1 | 1 |
| 9 A | 0 | 0 | 0 | 1 | 0 | 0 | 0 | 0 |
| 8 D | 0 | 0 | 0 | 0 | 1 | 0 | 0 | 0 |
| 7 A | 0 | 1 | 0 | 1 | 0 | 1 | 0 | 0 |
| 6 C | 0 | 0 | 0 | 1 | 1 | 1 | 0 | 0 |
| 5 D | 0 | 0 | 1 | 0 | 0 | 0 | 0 | 0 |
| 4 B | 0 | 0 | 1 | 1 | 1 | 1 | 0 | 0 |
| 3 A | 0 | 0 | 0 | 0 | 0 | 0 | 0 | 0 |
| 2 A | 0 | 0 | 0 | 1 | 1 | 1 | 0 | 0 |
| 1 E | 0 | 0 | 0 | 1 | 0 | 0 | 0 | 0 |
| 0 D | 0 | 0 | 0 | 1 | 1 | 1 | 0 | 0 |

Load should forward from this store — 710

Load store color — 705
SB tail — 720

Example is for SB with 16 entries

FIG. 7

METHOD AND APPARATUS FOR SATISFYING LOAD OPERATIONS

FIELD OF THE INVENTION

The invention described herein relates to the field of microprocessor architecture. More particularly, the invention relates to satisfying load operations while maintaining processor performance.

BACKGROUND

Microprocessor performance may be increased within a computer system by enabling load operations to be satisfied from fast-access memory resources, such as cache, before resorting to computer system memory resources, such as Dynamic Random Access Memory (DRAM), which may require more time to access. Data or instructions stored within DRAM are typically organized along page boundaries requiring extra "open" and "close" memory cycles when accessed. Data and/or instructions may also be stored within cache memory, such as a Level 2 (L2) cache memory in order to facilitate faster access of frequently-used data.

Memory resources, such as DRAM and L2 cache, may be included as part of a computer system's memory hierarchy, in which data or instructions may be stored according to the frequency of their use. Data or instructions may then be accessed from or stored to these memory resources in various proportions in order to satisfy load and store operations efficiently.

In the case of a load operation, the decision of which memory resource to access within the system memory hierarchy depends upon where the most current version of the addressed data or instruction is located at a particular time. For example, a particular memory location addressed by a load operation may not have the "freshest" data at a particular time, since prior store operations may still be pending, which have not written their data to the memory location. Therefore, until the store operation updates the memory location addressed by the load operation, the load operation may access "stale" data causing incorrect results or errors in program operation.

Instead of waiting for fresh data to be stored within the computer system's memory hierarchy, load operations may be satisfied by accessing one or more store buffers in which store operations are temporarily stored before being executed by a processor and subsequently writing their data to a location within the computer system's memory hierarchy. By accessing a store operation from a store buffer, the load operation may be satisfied and program operation may continue with correct data.

However, load operations may depend on multiple store operations. Therefore, a load operation must be able to obtain data from the most recent (youngest) store operation that has been issued to a store buffer before the issuance of the load operation (i.e., The youngest store that is older than the load). Determining which store a load ultimately depends upon may require a large amount of hardware and several bus cycles to complete.

A prior art technique of determining which store a load ultimately depends upon uses a Carry Chain Algorithm (CCA) (FIGS. 1a and 1b) to perform a store prioritization. The CCA may be implemented with a carry look-ahead circuit similar to that used in a high-performance adder circuit. Furthermore, a CCA may be able to perform the store prioritization in Order (log N) levels of logic, where N is the number of store buffer entries in a particular store buffer.

However, one short-coming of the CCA is that its worst-case time to complete a store prioritization is approximately equal to its best-case time. This is because the carry bits are propagated through the adder in parallel with the sum bits. While this may be acceptable for some sizes of store buffers, it can be detrimental to overall system performance as the store buffer size is increased. It is generally desirable to increase the size of store buffers within a super scalar microprocessor to the extent that it is economically viable to do so. Increasing the size of store buffers within a microprocessor reduces the number of cases in which a load must resort to system memory to retrieve data, and therefore decreases the cycle time overhead associated with accessing system memory.

Advantageously, store operations used by many software applications may be stored in close proximity to one another in a store buffer, since they are often executed as part of a modular software function within the application. Therefore, the youngest store operation upon which a load operation depends may be stored in close proximity to the first store that is older than the load operation (i.e., load color). In this case, searching all store buffer entries for the youngest store operation upon which a load operation depends, as in the prior art, can be an inefficient use of processor resources.

SUMMARY

A method and apparatus for satisfying load operations by accessing data from a store buffer is described herein. In at least one embodiment of the invention load operations are satisfied faster than some prior art techniques. In at least one embodiment of the invention, an improved technique for satisfying load operations is provided that does not significantly impact processor performance.

BRIEF DESCRIPTION OF THE DRAWINGS

The features and advantages will become apparent from the following detailed description in which:

FIG. 7 is a table illustrating the operation of one embodiment of the present invention.

DETAILED DESCRIPTION

A method and apparatus for satisfying load operations by accessing data from a store buffer is described herein. It is a further goal of the present invention to satisfy load operations faster than some prior art techniques in most cases. Finally, it is a goal of the present invention to provide an improved technique for satisfying load operations that does not significantly impact processor performance.

A Computer System

Figure 1A:
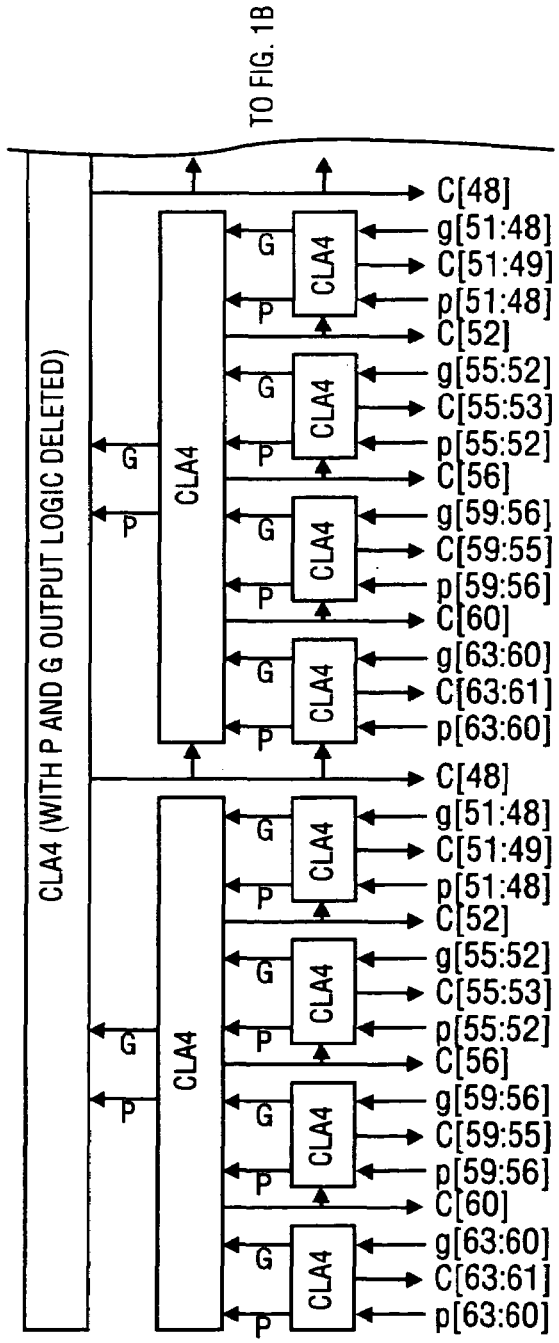
FIGS. 1a and 1b illustrate a prior art circuit for implementing a Carry Chain Algorithm.
Figure 1B:
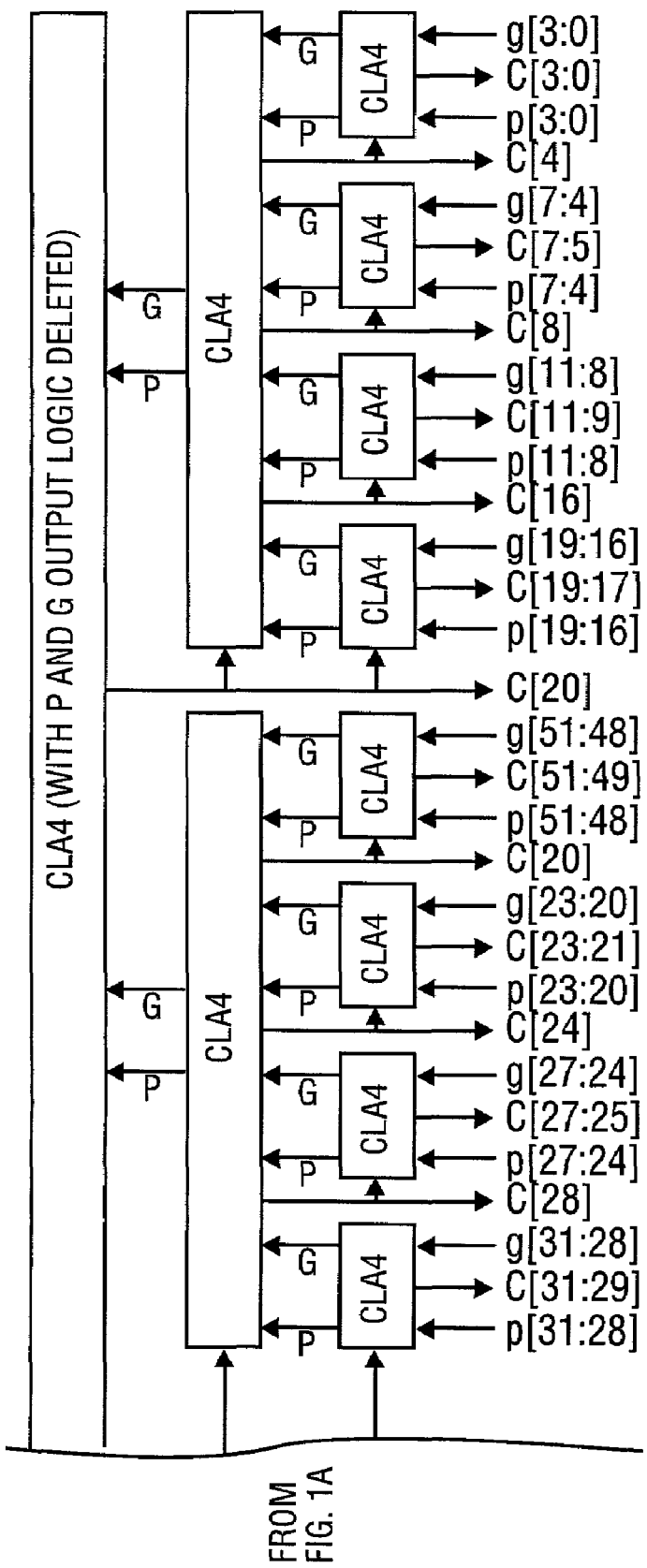
Figure 2:
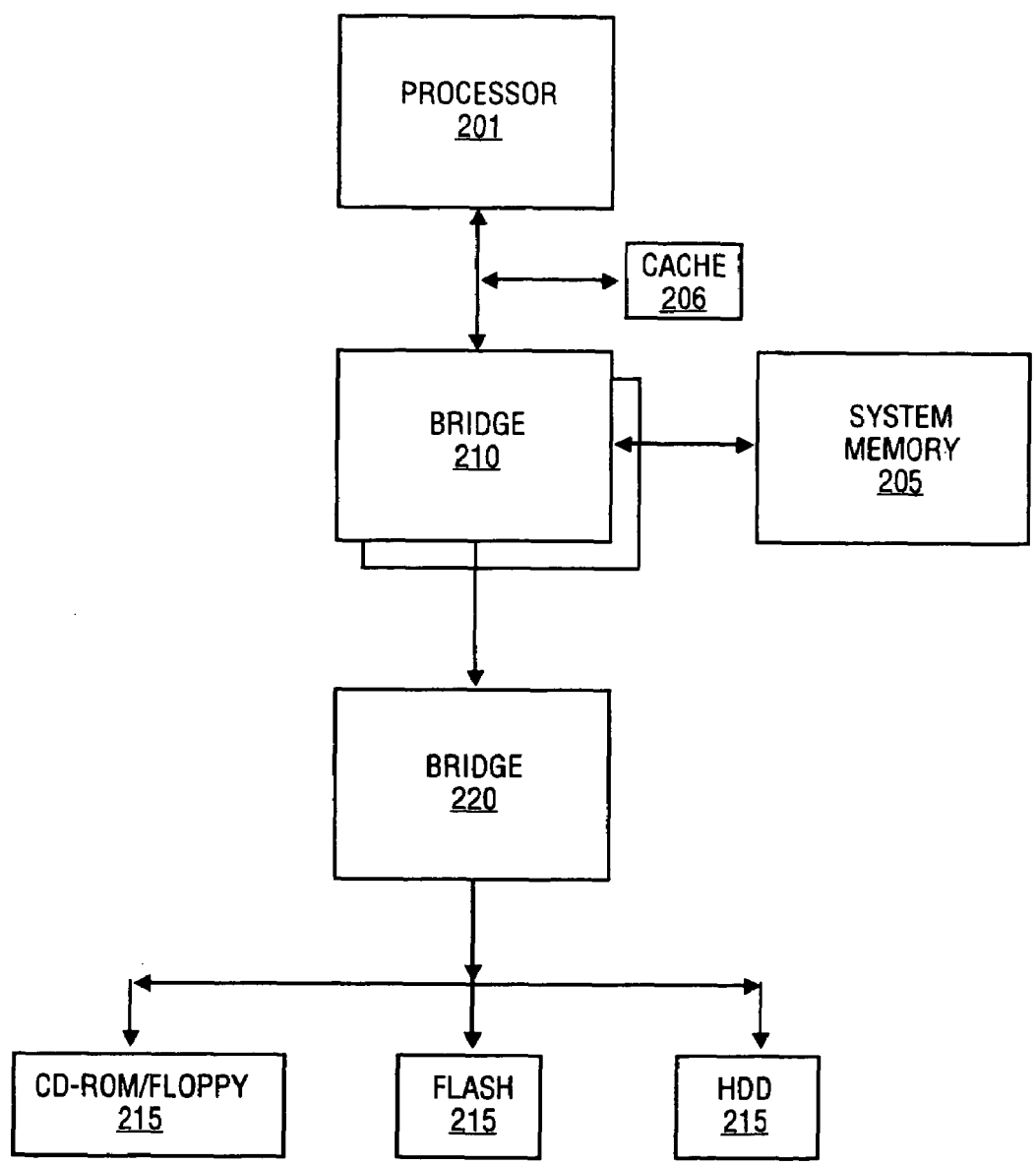
FIG. 2 illustrates a computer system according to one embodiment of the present invention.

FIG. 2 illustrates a computer system according to one embodiment of the present invention. The computer system of FIG. 2 contains a processor 201, system memory 205, a bridge device 210, a bridge device 220, and a non-volatile memory device 215.

The computer system illustrated in FIG. 2 may also consist of cache memory 206, and system memory 205. In one embodiment, the cache memory is a level 2 (L2) cache and the system memory is a Dynamic Random Access Memory (DRAM). The L2 cache memory and DRAM of FIG. 2 may consist of memory cells using Complimentary Metal-Oxide Semiconductor (CMOS) technology. However, other device technology as well as other memory devices may be used in other embodiments.

In the computer system illustrated in FIG. 2, instructions to be executed by the processor and data corresponding to the instructions may be stored within a non-volatile memory device and copied to locations within system memory. The non-volatile memory device may contain a machine readable medium to store a set of instructions, which when executed perform various operations and methods used in the present invention. In one embodiment, the non-volatile memory device is a Hard Disk Drive (HDD). In other embodiments, the non-volatile memory device is a as flash memory, a compact disk drive, floppy disk drive, or a combination of these.

Typically, data and instructions may be accessed or modified faster when stored within memory structures, such as L2 cache and DRAM, than when stored in a non-volatile memory device, such as an HDD. Therefore, software applications to be executed within a computer system, such as the one in FIG. 2, may be developed to access data and/or instructions within L2 cache and/or DRAM, before resorting to non-volatile memory.

Furthermore, applications executed within a computer system, such as that of FIG. 2, may organize data or instructions such that frequently used data or instructions are stored within the L2 cache, while less-frequently used data or instructions are stored within DRAM. The reason for organizing memory in this manner is to take advantage of the faster access capabilities of the L2 cache in relation to that of DRAM.

DRAM is typically organized in page memory structures. Before data may be accessed within DRAM, the page in which the data is to be read or written must be first 'opened' by issuing a bus command to the DRAM. Likewise, before another page may be accessed within DRAM, a previously opened page must first be 'closed' by issuing a bus command to the DRAM. Opening and closing pages of DRAM causes degradation in overall computer system performance due to the additional cycles needed to open and close the pages. This problem may be exacerbated as data or instructions are accessed within the DRAM more frequently. Storing frequently used data or instructions within a cache structure, such as an L2 cache, may, therefore, help to improve overall computer system performance.

A Processor

Figure 3:
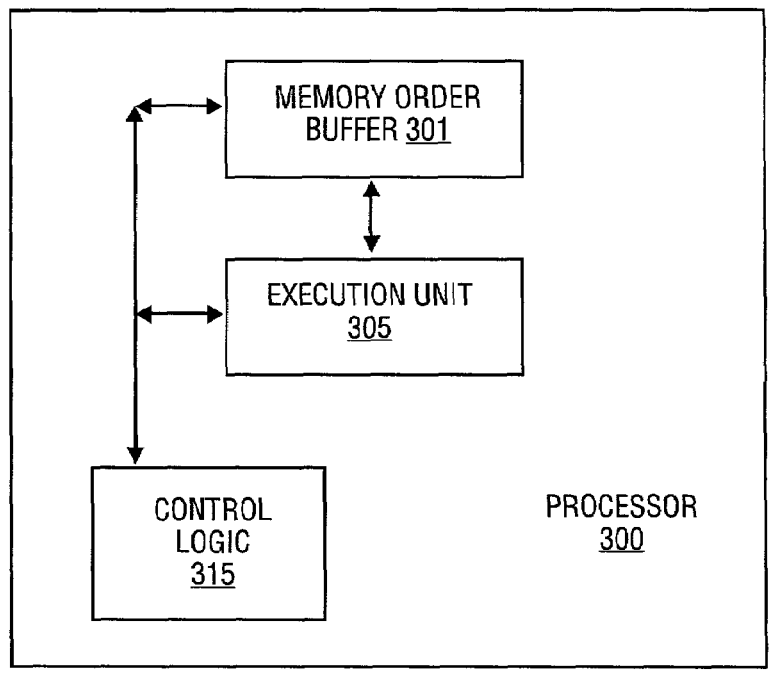
FIG. 3 illustrates a processor according to one embodiment of the present invention.

FIG. 3 illustrates a processor according to one embodiment of the present invention. The processor of FIG. 3 300 includes an execution unit 305, a memory ordering buffer (MOB) 301, and control logic 315.

In one embodiment of the present invention, the microprocessor of FIG. 3 is a pipelined, super scalar processor that may contain multiple stages of processing functionality. Accordingly, multiple instructions may be processed concurrently within the processor, each at a different pipeline stage. Furthermore, the execution unit may be pipelined in order to execute multiple instructions concurrently.

Some instructions executed within the processor may access data via load operations in order to complete execution. However, load operations may be dependent upon store operations taking place or ones that have taken place as a result of executing prior instructions. Memory accessed by load and store operations may include various memory structures, including level 1 (L1) cache, level 2 (L2) cache, and DRAM.

L1 cache is cache memory that is typically within close proximity to the processor. Like L2 cache, L1 cache consists of high-speed memory cells and may be used to store frequently accessed instructions and/or data. In one embodiment, L2 or L1 cache may consist of 6-transistor (6-T) static random-access memory (SRAM) cells manufactured using standard complementary metal-oxide semiconductor (CMOS) memory devices. Alternatively, other embodiments may use other memory technologies and architectures without departing from the scope of the present invention.

In embodiments of the present invention, L1 cache, L2 cache, and DRAM or combinations thereof compose a system memory hierarchy. Relative sizes of the L1 cache, L2 cache, and DRAM may be chosen to optimize performance and system cost by storing instructions and data within these memory structures according to the frequency of their use.

A Memory Ordering Buffer

Figure 4:
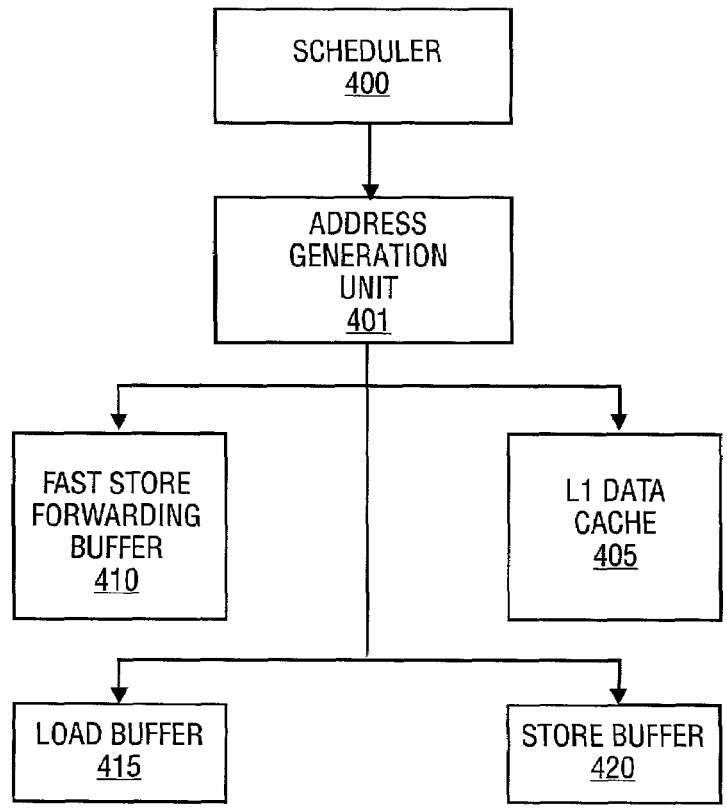
FIG. 4 illustrates a memory ordering buffer architecture according to one embodiment of the present invention.

FIG. 4 illustrates a memory ordering buffer (MOB) architecture according to one embodiment. The MOB of FIG. 4 includes an address generation unit 401, a scheduler 400 to schedule and issue load and store operations to an L1 data cache 405 and/or a store buffer 410, respectively, and a load buffer 415 along with a store buffer 420. In one embodiment, the store buffer is a fast store-forwarding buffer (FSFB). The FSFB is a memory device that may store operations intended to store data to system memory when executed. Store operations within the FSFB can be accessed by load operations quickly in order to retrieve data upon which the load depends, without resorting to the system memory hierarchy.

Store operations within a store buffer are subsequently executed and the locations within the system memory hierarchy addressed by the stores are updated. Load operations may, however, be satisfied by retrieving data from store operations queued within the store buffer, rather than waiting for a store within the store buffer to update the memory hierarchy.

Since numerous store operations may contain data to be stored within the same location within the memory hierarchy, it may be necessary to search through entries of the store buffer to locate the most recent ("youngest") store operation that has been issued by the scheduler subsequent to the load operation depending on it (i.e., the youngest store older than the load). In some instances, the search may require substantial time and hardware for large store buffers, such as those used in super scalar microprocessor architectures. Therefore, a technique in which to search a large store buffer for the youngest store upon which a load operation depends is desirable.

Searching a Store Buffer

A feature of the present invention is an ability to determine which store operation within a store buffer a load is dependent upon relatively quickly within a majority of cases. In the cases in which the store operation upon which a load operation depends cannot be quickly identified, the present invention further enables the load to be processed without preventing subsequent operations from being executed by the processor.

In order to accomplish a quick search within a potentially large store buffer for the youngest store upon which a load depends, an ordered search may be performed, starting at the youngest store that is older than the load (the "load color"), and proceeding to the oldest (least recently stored) valid store in the store buffer (store buffer "tail"). The load color and tail may be indicated within an identification field assigned to each store operation prior to being issued. In one embodiment, the identification field may be assigned by an instruction scheduler state machine when store operations are scheduled for execution. An identification field may also be used to facilitate an ordered search among the store operations to determine the location of a youngest store operation older than the load operation having at least a partial matching target address to that of the load operation.

Either before or after a load color is determined, a store is identified whose target address within the memory hierarchy matches that of the load being processed. A matching store operation may be identified in various ways, including comparing the target address of each store operation within the store buffer with the target address of the load operation being processed and storing the result within a content-addressable memory (CAM) associated with the store buffer entry being compared.

The target address comparisons may be made using various techniques and/or circuits, including those in the prior art. In one embodiment, a target address of each store operation within the store buffer is compared with the target address of the load operation in a parallel fashion. In other embodiments, the comparison may be done serially. Furthermore, only a portion of the store operation target address may be compared with a corresponding portion of the load operation being processed in order to reduce the logic necessary to perform the comparison.

A CAM is a circuit that can store data pertaining to a store buffer entry to which it corresponds. A CAM may be implemented within each store buffer entry or in a separate circuit or memory device that can be accessed in order to determine whether a match has occurred between a store operation target address and that of a load operation. A CAM may also include compare circuitry to perform the target address comparisons previously mentioned. Furthermore, a CAM may include a target address portion of a store operation to which it corresponds, such that the CAM may compare a store target address with that of a load operation and store the results as well.

CAM circuits may be manufactured using standard CMOS device technology or other memory technologies without departing from the scope of the present invention. In one embodiment, the CAM is an SRAM cell, but in other embodiments, the CAM may be implemented with other memory cell structures.

Figure 5:
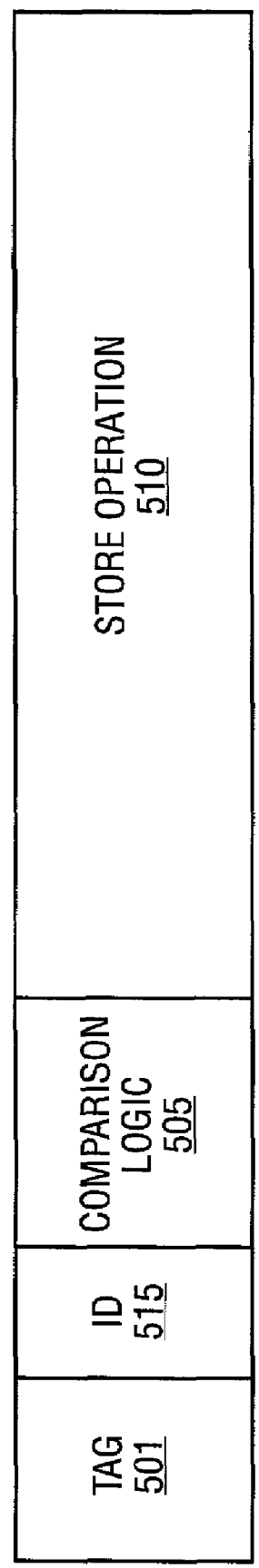
FIG. 5 illustrates a store buffer entry according to one embodiment of the present invention.

FIG. 5 illustrates a store buffer entry in accordance with one embodiment of the present invention. It includes a tag field 501 to hold at least a portion of a target address of the corresponding store operation 510 and a CAM 505 capable of providing the result of a comparison between the target address stored in the tag and the target address of the load operation. Furthermore, the store buffer entry may contain an identification field 515 to indicate the program order of each store operation in relation to others within the store buffer.

A CAM may be stored within each store buffer entry to indicate whether a target address match exists between a load operation and the store to which the CAM corresponds. This data may be read into a vector, which can then be searched in order to locate a youngest matching store operation that is older than the load operation being processed. For example, the vector may contain 1's at positions corresponding to a target address match and 0's in other vector positions.

A search of the CAM vector entries may then be performed in program order to yield the relative location of a store buffer entry corresponding to a matching target address of the load being processed. Program order can be determined by reading the identification field associated with each store operation within the store buffer. In one embodiment, the ordered search may yield a carry vector to indicate a location within the CAM vector of a matching target address according to the equation $C_i = G_i + P_i C_{i+1}$, where i is counter from 0 to N−1 entries within the store buffer.

The above equation may be implemented using various carry generation circuits or algorithms. In one embodiment of the present invention, a carry generation of a carry-ripple adder may be used, while in other embodiments the above carry generation equation may be implemented with other hardware circuits, software, or a combination thereof.

Figure 6:
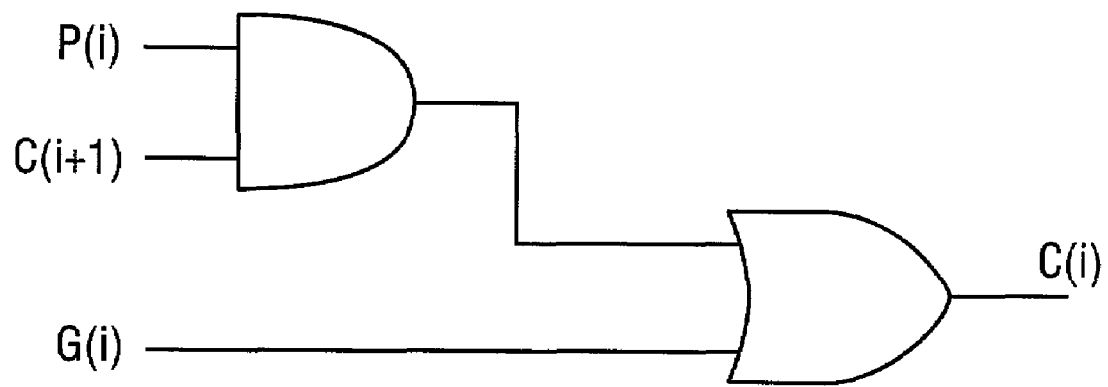
FIG. 6 illustrates a carry generation circuit of a ripple-carry adder stage according to one embodiment of the present invention.

FIG. 6 illustrates a carry generation circuit of a carry-ripple adder according to one embodiment. The carry generation circuit of FIG. 6 generates a carry bit in a sequential manner among each stage of a carry-ripple adder, thereby requiring a time of Order (N) to compute a carry of the final stage. In each stage of the carry generation circuit, a propagate (P), generate (G), and carry (C) output is generated, where P corresponds to non-matching CAM vector entry positions, G indicates the load color position within CAM vector, and C indicates the CAM vector position of a matching target address of the youngest store operation older than a load operation being processed.

In one embodiment of the present invention, the vector, $P_i$, is the inverse of the CAM match vector, such that the $P_i$ vector contains 1's in entries corresponding to non-matching CAM vector entries. The carry generation circuit propagates a carry bit among subsequent CAM vector entries until a CAM match is encountered, indicated by the output, $C_i$. Once a CAM match is encountered, the $C_i$ vector will become zero, which can be interpreted to indicate that a CAM match has occurred at a CAM vector position corresponding to the youngest store operation older than a load operation being processed.

Once a match condition corresponding to the youngest store older than the load is found, the search ceases and the load operation may be satisfied by accessing the data associated with the matching store operation. However, if the ordered search continues to the store buffer tail, a $P_i$ value of 0 may be inserted into the tail position of the CAM vector to force the search to wrap around to the beginning of the store buffer and continue searching. In order to distinguish the store buffer tail from a valid CAM match, the $P_i$ value at the tail position may be qualified with the value of $C_i$ at the tail position.

FIG. 7 illustrates an example of the operation of one embodiment of the present invention. In particular, the table of FIG. 7 illustrates the CAM vector values 710, corresponding to the store buffer entries 0 to 15 with target addresses 705 matching or not matching with that of a load operation. Furthermore, the table shows the values of the propagation vectors 715, generation vector values 720, and carry vector output values 725 resulting from an application of the equation, $C_i=G_i+P_iC_{i+1}$ 730. Each entry within the table of FIG. 7 correspond to the program order of the store operations.

The embodiment illustrated in FIG. 7 takes advantage of the fact that if a load is dependent upon a store in the store buffer, it is likely to be dependent upon one that is relatively recent in relation to other store operations in typical applications. This is due, at least in part, to techniques commonly used to develop software applications, including recursive software routines. Therefore, the youngest store upon which the load depends may be found within relatively close proximity to the load color, thereby enabling the load to be satisfied without incurring long delays that can result from searching through the entire CAM vector in most cases.

The worst case time to compute a match using the carry generation circuit of FIG. 6 may be of Order (N), where N is the number of store buffer entries. However, the actual time to process a load is a function of the inputs $P_i$ and $G_i$, and independent of the number of store buffer entries. If a load is dependent upon a relatively young store, then the $P_i$ vector will limit the extent of carry propagation from the load color. Therefore, the average time to process a load may be directly proportional to the number of non-matching stores between the load color and first matching store, independent of the size of the store buffer.

If the number of store buffer entries is relatively large, the typical time to process a load using a carry generation circuit will be substantially less than that of carry look-ahead logic, used in the prior art. Processor performance may be increased using techniques to take advantage of the present invention, such as pipelining load operations. In other embodiments, processor performance is increased by using larger store buffers, or searching a number of store buffers in parallel, or a combination of pipelining, larger store buffers, and parallel searching. Other embodiments may employ other techniques that take advantage of the present invention.

Load Replay

In cases in which it may take longer to process a load than desired, the load may be replayed. In one embodiment of the present invention, an indication is made to pipeline control logic 315 to replay the load after a predetermined number of store buffer entries have been searched. The replay may be performed outside of the critical path within the processor, thus precluding a store buffer search from preventing further operations from being processed and reducing the processing rate of the microprocessor.

In one embodiment, a carry-chain algorithm (CCA) may be used to search one or more store buffers concurrently with or subsequently to a search by a carry generation circuit of a carry-ripple adder. A CCA operating in parallel with a carry generation circuit may continue searching a remainder of the store buffer after the carry generation circuit fails to process the load within a desired amount of time.

An amount of time may either be predetermined or determined during the operation of a system in which the present invention is used. A CCA may be used to search after the carry generation circuit search times out as it can propagate a search through the store buffer entries faster than a carry generation circuit of a carry-ripple adder. Therefore, fewer cycles are spent searching the remaining store buffer entries after the search by the carry generation circuit "times out". However, in other embodiments, other search techniques may be used to search the remaining buffer entries once the carry generation circuit search times out, including another carry generation circuit.

In order to detect when a carry-ripple circuit has exhausted an amount of time in which to process a load, a number of store buffer entry search propagations (indicated by $P_i$) exceeding M entries may be detected, where M is a number of entries corresponding to the amount of time in which to process a load.

Figure 8:
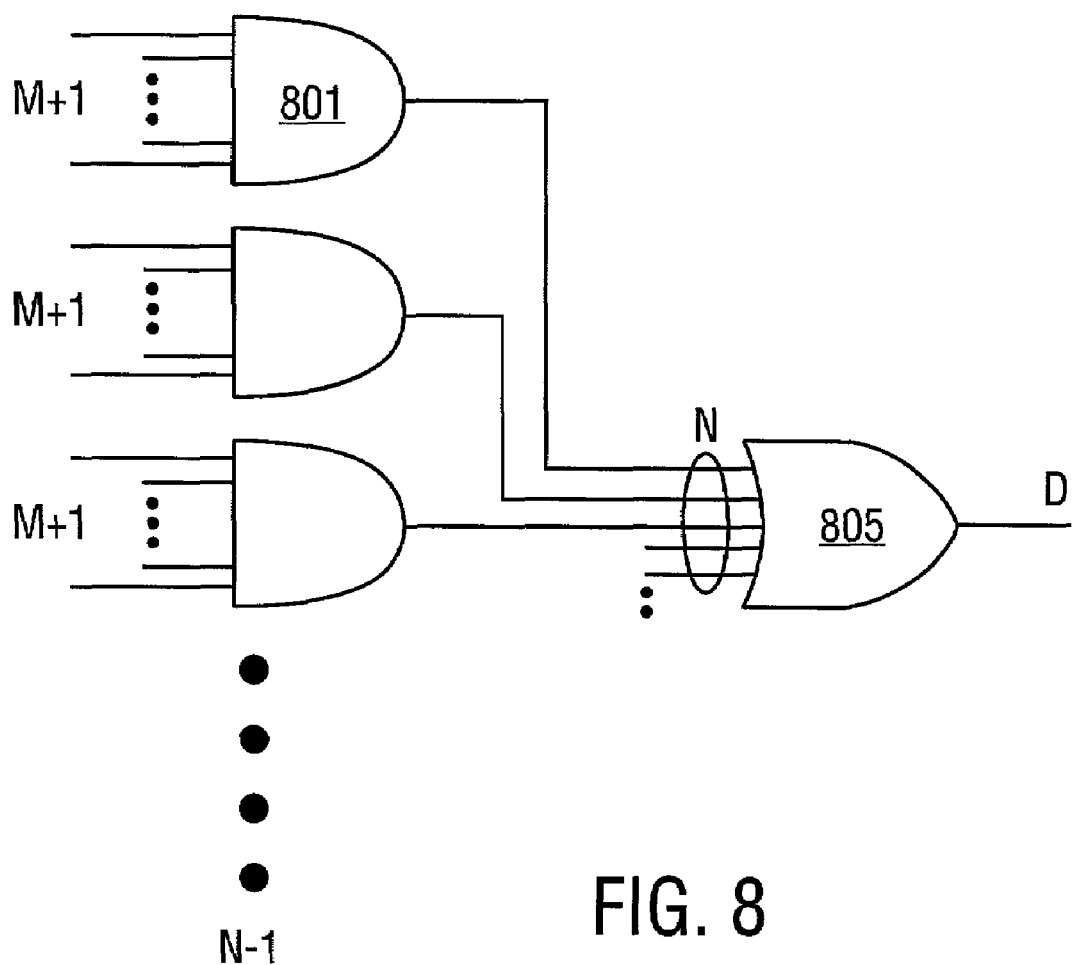
FIG. 8 illustrates a detection circuit according to one embodiment of the present invention.

FIG. 8 illustrates a detection circuit according to one embodiment of the present invention in which propagation runs of more than M entries are detected. In the embodiment illustrated in FIG. 8, detection of propagation runs of more than M entries may be implemented with N M+1-input AND gates 801 feeding an N-input OR gate 805. Inputs of each AND gate define an M+1 bit store buffer window, each starting one bit position over from the previous gate. The final OR-gate output would be a 1 if there existed a propagation path of M+1 entries or more.

The amount of logic of FIG. 8 can be reduced by sliding each AND gate over by more than one bit position with respect to the previous gate and reducing the fan-in to each AND gate. This may result in a replay signal that is less precise in that it can signal a replay in some cases where the propagation path is less than M+1. However, accuracy may be improved with additional logic. Furthermore, the detection circuit of FIG. 6 may be implemented using software, hardware, or some combination thereof.

The circuit of FIG. 8 may be manufactured using standard CMOS device technologies or other device technologies without departing from the scope of the present invention. Alternatively, the detector of FIG. 8 may be implemented using software or a combination of software and hardware.

Pre-Detection

Although a detection technique illustrated by the circuit of FIG. 8 can detect the case where a propagation path is longer than that allowed by the microprocessor pipeline, it may not detect the case where the load does not depend upon any store in the store buffer. In this case, it may be necessary to detect before searching through each store buffer entry whether a load will be satisfied by a store buffer entry in order to prevent long search times in one instance and unnecessary replays in another instance.

Figure 9:
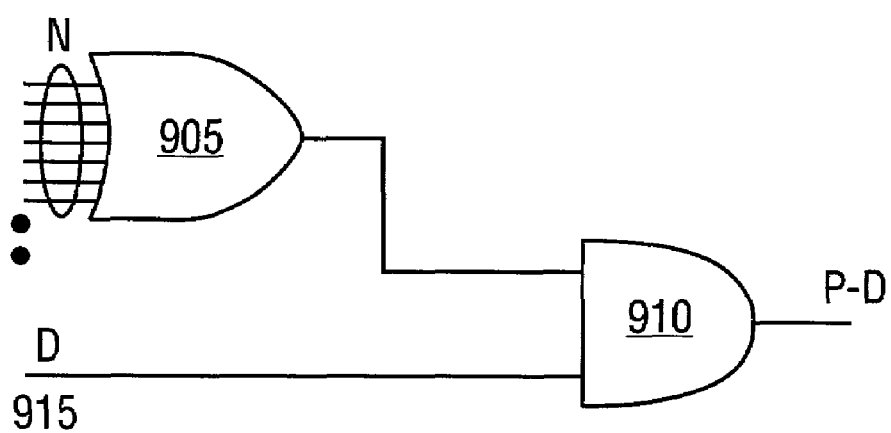
FIG. 9 illustrates a pre-detection circuit according to one embodiment of the present invention.

In order to pre-detect whether a load will be satisfied by any entry in the store buffer, an N-bit OR 905 of the CAM result may be AND'ed 910 with the result 915 of the replay detection circuit of FIG. 8, as illustrated in FIG. 9. This pre-detection technique will cause the load to be replayed only if it CAM matches on at least one store buffer entry and there is a propagation path that is longer than desired. In another embodiment, a detection could be made as to whether there are younger stores than the load within the store buffer.

Although the above techniques are illustrated using hardware circuits, they may also be implemented in software or a combination of hardware and software.

A Method for Servicing Load Operations
According to One Embodiment

Figure 10:
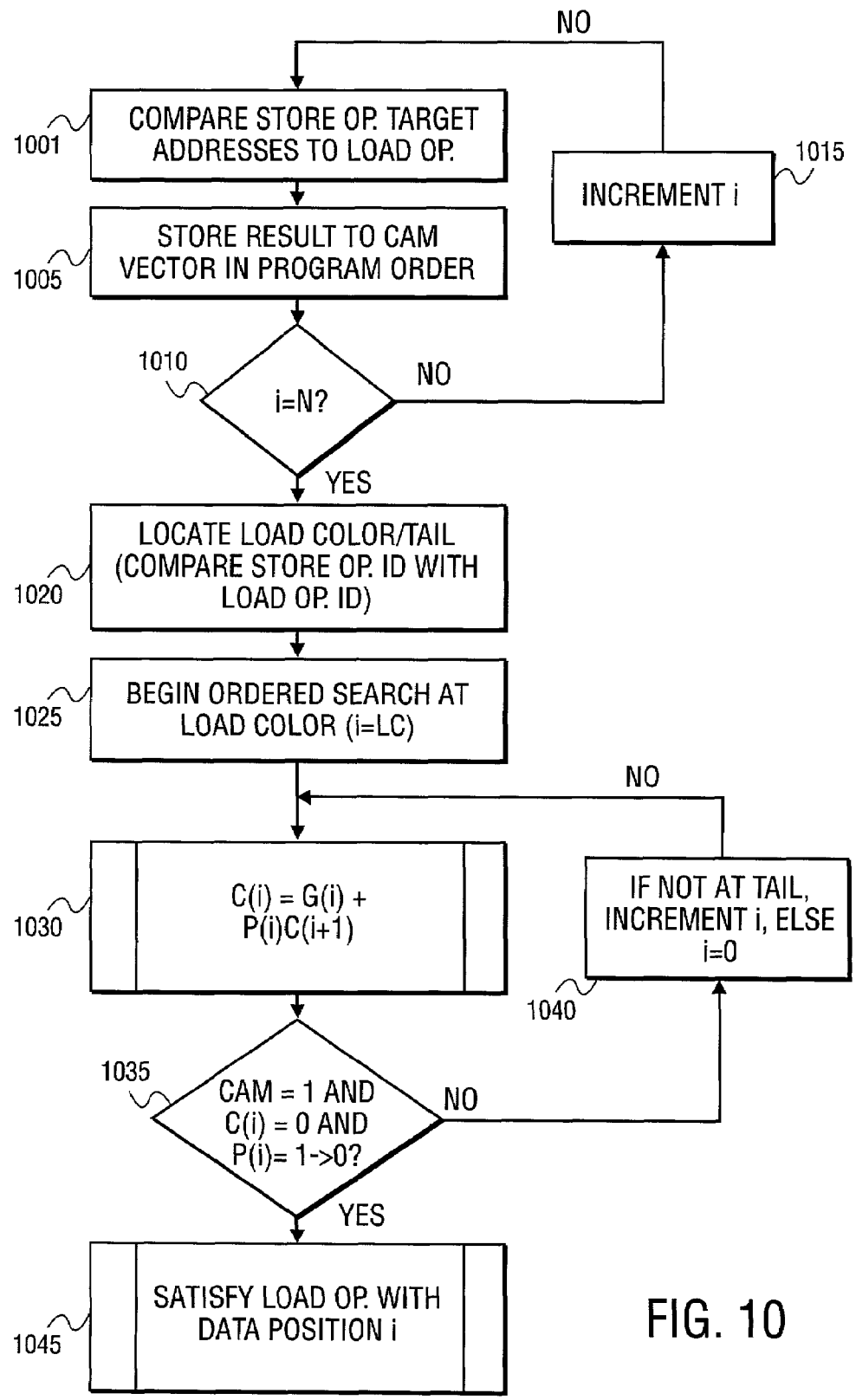
FIG. 10 is a flow diagram illustrating a method according to one embodiment of the present invention.

FIG. 10 illustrates a method for carrying out the present invention according to one embodiment. A CAM match is performed on each entry of the store buffer 1001 to create a CAM vector 1005 indicating the relative locations of store operations with a matching target address portion to that of the load operation being processed. This process continues until all store buffer entries have been searched, as indicated with counter i. If i does not equal N (number of store buffer entries) 1010, then i is incremented 1015 and CAM matching continues.

Once all store buffer entries have been CAM matched and a CAM vector created, the load color and tail are identified 1020. In the embodiment of FIG. 10 each CAM vector entry is stored in program order according the identification field associated with the corresponding store operation. By comparing the identification field of each store operation to that of the load operation being processed, the load color and tail may be identified. The load color and tail are identified by setting $G_i$ to 1 at the corresponding location in the $G_i$ vector.

An ordered search on the CAM vector entries is then performed 1025 to locate the relative position in the CAM vector of the first store operation with a matching target address portion to that of the load operation being processed. Since the ordered search began at the load color, the next matching CAM entry will be the youngest store older than the load operation having a matching target address portion to that of the load operation. The ordered search is done according the equation $C_i=G_i+P_iC_{i+1}$ 1030 and propagates through the CAM vector entries as long as $P_i$ is equal to 1. When a CAM match is detected (indicated by a 1 in the corresponding CAM vector entry), $C_i$ will become 0 and $P_i$ will transition from 1 to 0 1035. If this condition is not met, the search will continue unless the tail is encountered, in which case the ordered search will continue at the first entry within the CAM vector 1040.

The CAM vector entry at which these conditions are met indicates the youngest store operation upon which the load operation depends, and the load operation may be satisfied by reading the corresponding store data 1045.

While this invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A method comprising:
   Sequentially searching among a plurality of store operations for a most recent store operation upon which a load operations depends, wherein the sequential searching is to start at a load color corresponding to a most recent store operation of said plurality of store operations that is older than said load operation and to continue sequentially through the plurality of store operations only until the most recent store operation upon which the load depends is found;
   satisfying said load operation after said most recent store operation upon which a load operation depend is identified, wherein the most recent store operation upon which the load operation depends is not the load color.

2. The method of claim 1 further comprising replaying said load operation if said most recent store operation is not detected within a first amount of time.

3. The method of claim 2 wherein an amount of time to find said most recent store operation is independent of a total number of said plurality of store operations.

4. The method of claim 3 further comprising pre-detecting whether said load operation will be satisfied by any of said plurality of store operations, said pre-detecting occurring prior to said sequential searching.

5. The method of claim 4 wherein said pre-detecting comprises determining whether any of said plurality of store operations have a target address portion matching a target address portion of said load operation.

6. The method of claim 5 wherein said replaying is enabled to be performed incidentally to a critical path within a processor.

7. The method of claim 6 further comprising comparing a target address portion of said load operation with a plurality of target address portions of said plurality of store operations.

8. The method of claim 7 wherein a time required to perform said searching is proportional to a number of store operations having a target address portion that does not match said target address portion of said load operation.

9. An apparatus comprising:
   a first unit to store a plurality of store operations;
   a second unit to compare a plurality of target address portions of said plurality of store operations to a target address portion of a load operation;
   a plurality of third units to store a plurality of outputs from said second unit, each of said plurality of third units corresponding to one of said plurality of store operations;
   a fourth unit to search comparison results output from the second unit to the plurality of third unit starting at a load color corresponding to a most recent store operation of said plurality of store operations that is older than said load operation and continuing sequentially through the plurality of store operations only as long as there is not a match between a target address portion of the load operation and a target address portion of one of the plurality of store operations, wherein the target address portion of the load operation does not match a target address portion of the load color.

10. The apparatus of claim 9, further comprising a fifth unit to replay said load operation if a matching target address portion is not detected within a predetermined amount of time.

11. The apparatus of claim 10 further comprising a sixth unit to count a number of searched store operations, said number of searched store operations corresponding to said predetermined amount of time.

12. The apparatus of claim 11 further comprising a seventh unit to continue searching for said matching target address portion after said load operation is replayed, said seventh unit enabled to search during a time when said fourth unit searches for said matching target address portion.

13. The apparatus of claim 12 further comprising an eighth unit to pre-detect whether there is a store operation within said plurality of store operations with a target address portion matching that of said load operation, said eighth unit being enabled to pre-detect prior to said fourth unit searching.

14. The apparatus of claim 13 wherein said first unit is a store buffer.

15. The apparatus of claim 14 wherein said plurality of third units comprise content addressable memory.

16. The apparatus of claim 15 wherein said fourth unit is a unit to implement a carry generation circuit of a carry-ripple adder.

17. The apparatus of claim 16 wherein said seventh unit is a unit to implement a carry chain algorithm.

18. A system comprising:
   a first unit to issue a load operation;
   a second unit to store a plurality of store operations;
   a third unit to search said plurality of store operations starting at a load color corresponding to a most recent store operation of said plurality of store operations that is older than said load operation and continuing sequentially through the plurality of store operations only until a most recent store operation upon which the load operation depends is found, wherein the most recent store operation upon which the load operation depends is not the load color.

19. The system of claim 18 further comprising a memory hierarchy, said memory hierarchy comprising a cache memory and a system memory.

20. The system of claim 19 wherein said first unit is enabled to be accessed before said memory hierarchy in order to satisfy said load operation.

21. The system of claim 20 further comprising instructions corresponding to a software application, said instructions comprising said load operation.

22. The system of claim 21 wherein a plurality of load operations may be processed concurrently.

23. The system of claim 18 further comprising a pre-detector unit to detect whether any of said plurality of store operations has a target address portion matching that of said load operation prior to said second unit searching said plurality of store operations.

24. A machine-readable medium having stored thereon a set of instructions, which if executed by a machine, cause said machine to perform a method comprising:
   creating a vector comprising entries corresponding to a plurality of store operations;
   determining a location of a load color within said vector, said load color corresponding to a youngest store operation among said plurality of store operations that is older than a load operation;
   searching a subset of said entries starting at said load color and continuing only until a matching entry corresponding to a store operation with a target address portion matching that of said load operation is identified, said matching entry being identified by a match between the load operation's target address and the most recent store operation's target address, a carry bit associated with the most recent store operation being equal to a first value, and a propagation bit associated with the most recent store operation having transitioned from a first value to a second value;
   replaying said load operation if said matching entry is not found within a predetermined number of vector entries, wherein said matching entry, if found, is not the load color.

25. The machine-readable medium of claim 24 wherein said replaying is performed without preventing subsequent load operations from being processed.

26. The machine-readable medium of claim 25 wherein a time to find said matching entry is independent of a total number of said entries.

27. The machine-readable medium of claim 26 further comprising replaying said load operation if said matching entry is not found within a predetermined amount of time.

28. The machine-readable medium of claim 24 further comprising pre-detecting whether said matching entry exists within said entries prior to said searching.

29. The machine-readable medium of claim 28 wherein said searching is not performed if said pre-detecting does not detect said matching entry.

30. An apparatus comprising:
   a first unit to compare a plurality of target address portions of a plurality of store operations to a target address portion of a load operation;
   a second unit to store results of a plurality of comparisons by said first unit;
   a third unit to create a generate signal corresponding to a position of a load color and a signal corresponding to a tail among said results, said load color corresponding to a youngest store operation among said plurality of store operations that is older than said load operation, said tail corresponding to an oldest store operation among said plurality of store operations that is older than said load operation;
   a fourth unit to create a propagate signal corresponding to a non-matching result of a comparison by said first unit;
   a fifth unit to search a subset of said results starting at the load color and continuing sequentially through the plurality of store operations only as long as there is not a match between a target address of the load operation and a target address of one of the plurality of store operations, wherein the target address of the load operation does not match a target address of the load color.

31. The apparatus of claim 30 further comprising a sixth unit to replay said load operation if said match is not identified within a predetermined amount of time.

32. The apparatus of claim 30 further comprising a sixth unit to replay said load operation if said match is not identified within a predetermined number of said results.

* * * * *